US007227073B2

(12) United States Patent  
Kim

(10) Patent No.: US 7,227,073 B2  
(45) Date of Patent: Jun. 5, 2007

(54) PLAYLIST MANAGING APPARATUS AND METHOD

(75) Inventor: Duil Kim, Suwon (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 280 days.

(21) Appl. No.: 10/650,669

(22) Filed: Aug. 29, 2003

(65) Prior Publication Data

US 2004/0123725 A1 Jul. 1, 2004

(30) Foreign Application Priority Data

Dec. 27, 2002 (KR) ............... 10-2002-0085121

(51) Int. Cl.  
*A63H 5/00* (2006.01)

(52) U.S. Cl. .......................... 84/609; 386/95

(58) Field of Classification Search .............. 84/609; 386/95, 98, 125, 126; 707/3; 369/47.12, 369/47.33  
See application file for complete search history.

(56) References Cited

U.S. PATENT DOCUMENTS

| 5,668,788 | A * | 9/1997 | Allison .................. 345/173 |
| 6,181,653 | B1 * | 1/2001 | Wada et al. ............. 369/47.33 |
| 6,198,877 | B1 | 3/2001 | Kawamura et al. ........... 385/37 |
| 6,388,965 | B2 * | 5/2002 | Ozawa et al. ............ 369/47.12 |
| 6,898,369 | B2 * | 5/2005 | Tanaka et al. .............. 386/95 |
| 2004/0017997 | A1 * | 1/2004 | Cowgill .................. 386/65 |
| 2004/0128286 | A1 * | 7/2004 | Yasushi et al. ............. 707/3 |
| 2005/0019013 | A1 * | 1/2005 | Seo et al. ................ 386/95 |
| 2006/0026634 | A1 * | 2/2006 | LaChapelle et al. .......... 725/34 |
| 2006/0032363 | A1 * | 2/2006 | Platt .................... 84/601 |

FOREIGN PATENT DOCUMENTS

| JP | 02-139783 | 5/1990 |
| JP | 04-351777 | 12/1992 |
| JP | 7-14365 A | 1/1995 |
| JP | 2000-215650 A | 8/2000 |
| JP | 2000-339818 | 12/2000 |
| JP | 2001-167565 | 6/2001 |
| JP | 2001-210017 | 8/2001 |
| JP | 2001-291365 A | 10/2001 |
| JP | 2002-112185 | 4/2002 |
| JP | 2002-117649 A | 4/2002 |
| JP | 2002-171467 | 6/2002 |
| JP | 2003-022655 | 1/2003 |
| JP | 2003-030969 | 1/2003 |
| KR | 2001-0020240 A | 3/2001 |
| KR | 2001-0050897 A | 6/2001 |

OTHER PUBLICATIONS

Multi Audio Specifications (Revision 1.10, Sep. 18, 2002, OSTA).  
Japanese Office Action corresponding to Japanese Patent Application No. 2003-291699, Apr. 18, 2006.

* cited by examiner

*Primary Examiner*—Lincoln Donovan  
*Assistant Examiner*—Jianchun Qin  
(74) *Attorney, Agent, or Firm*—Sughrue Mion, PLLC

(57) ABSTRACT

The present invention relates to a playlist managing apparatus and method capable of automatically generating and updating a playlist in response to a dynamic change in taste of a user. Hit rates for respective pieces of audio data are calculated based on output states of the pieces of audio data while they are decoded and output, and the playlist is updated or a playlist is generated based on the calculated hit rates, so that pieces of audio data that a user does not like cannot be reproduced.

17 Claims, 8 Drawing Sheets

X_T_10.MAU

X_T_50.MAU

X_T_100.MAU (b)

Y_K_BLUE.MAU

Y_K_ROCK.MAU

Y_K_POP.MAU (c)

Z_P_TOT.MAU

Z_P_10.MAU

Z_P_20.MAU

PLAYLIST MANAGING APPARATUS AND METHOD

BACKGROUND OF THE INVENTION

The present invention claims foreign priority under 35 U.S.C. § 119 based on Korean Patent Application No. 10-2002-0085121, filed Dec. 27, 2002, the contents of which is incorporated herein by reference.

1. Field of Invention

The present invention relates to a playlist managing apparatus and method, and more particularly, to a playlist managing apparatus and method capable of automatically generating and updating a playlist in response to a dynamically changing taste of a user.

2. Description of the Prior Art

In the related art, a compact disc (CD) is an optical storage medium constructed such that data such as texts, audios and videos are sorted and stored therein based on tracks. The data recorded on the tracks can be read out when desired. Each CD comprises a lead-in area on which a table of contents (hereinafter, referred to as "TOC") including information on the number of tracks, starting points of the tracks, lengths of the tracks and the like is recorded, a program area in which audio data are actually recorded, and a lead-out area indicating the end of the CD, in accordance with the Red Book standards.

In the case of a related art audio CD, the number, names and play times of pieces of music recorded in the CD are included in the TOC in the lead-in area. When the audio CD is inserted into a CD player, the TOC recorded in the lead-in area is read out and the audio data can be reproduced according to the information included in the TOC.

However, the related art has various problems and disadvantages. For example, but not by way of limitation, the related art audio CD made in accordance with Red Book standards employs a scheme by which the TOC is sequentially read from the beginning to the end thereof. Thus, there is a related art problem in that the initialization time required for recognizing a large number of pieces of audio data recorded on the CD is increased by this access method.

Further, in case of the audio CD made in accordance with Red Book standards, since only information on play times for the respective tracks is included in the TOC, there is a related art problem in that it is impossible to perform a keyword search using a keyword such as the name of a musician, the name of a piece of music or the name of an album. Thus, a great deal of time and effort is needed to search for a desired piece of music.

To solve these related art problems, research has been actively conducted on CD standards capable of reducing access time to a CD by reading the TOC within a short period of time, and of providing a search function for a piece of audio music by simultaneously recording information on artists, kinds, albums and the like in the TOC.

As one of such CD standards, a proposed MultiAudio specifications (Revision 1.10, 2002.9.18, OSTA; hereinafter, referred to as "MA") format is capable of reproducing digital audio data compressed in a format independent of a file system, even by using other storage medium as well as a CD. MA is a kind of audio data recording format that allows a disc with compressed digital audio data such as MP3 or WMA files recorded thereon to be used in the same manner as an audio CD meeting the general Red Book standards.

FIG. 1 is a view showing a layout of the MA. A plurality of pieces of audio data, a TOC file (TOC.MAU), and one or more TrackList files such as Blues.MAU or Jazz.MAU are recorded on a CD meeting the MA specifications. The TOC file includes a TrackEntries field for indicating positions of respective pieces of digital audio data, and a User Defined Playlist field for indicating TrackEntries arranged in the order desired by a user. The TrackList file includes a field with TrackEntries arranged in the same order as the Playlist field in preparation for lack of memory of a storage medium.

In other words, in case of the MA, tracks or part of tracks that are recording units of audio data are set as one user defined track, and a playlist that is the order of reproducing tracks based on each piece of music desired by a user is generated and recorded on the user defined track. Thus, only pieces of music desired by the user can be sequentially reproduced in the future in accordance with the playlist of the pieces of music that the user wants to reproduce.

However, in case of a CD in which digital audio data corresponding to as many as 200 pieces of music are recorded, it is difficult to set the order of pieces of audio data, which are desired among such a large number of pieces of audio data, at a time and to generate the playlist. Accordingly, the user presses the skip button whenever undesired pieces of audio data in the playlist are reproduced, or perform an operation for deleting the undesired pieces of audio data from a relevant playlist.

More specifically, once a playlist is generated, the generated playlist is immediately burned on a CD. Thus, in a case where the playlist is recorded on an unwritable CD, it is impossible to edit the playlist. In such a case, the user presses the skip button whenever an undesired piece of music is reproduced during reproduction of the pieces of audio data included in the playlist. Further, even though a playlist is recorded on a writable CD, the user performs an operation for deleting relevant pieces of music from the playlist by editing the playlist. Thus, there is a problem in that the related art scheme as discussed above is cumbersome.

That is, although the audio CD made in the MA format can provide rapid initialization driving and a keyword search function for a piece of audio music, there is a limitation in that it is impossible to provide a playlist that responds to a dynamic change in taste of the user.

SUMMARY OF THE INVENTION

The present invention is conceived to solve the aforementioned problems. An object of the present invention is to provide an apparatus and method for allowing a user to listen to only desired pieces of audio data without performing an additional operation by automatically generating or updating a playlist in response to a change in taste of the user in a storage medium made in the MA format.

In order to achieve the object, a playlist managing apparatus comprises a disc-driving unit that receives audio data from a storage medium, a decoder that receives the audio data from the disc-driving unit, and decodes and outputs the received audio data, and a central control unit that controls operations of the disc-driving unit and the decoder in response to at least one input control signal. The apparatus includes a playlist management unit that calculates a hit rate for the audio data based on an output state of the audio data, and that generates a playlist based on the calculated hit rates.

A playlist managing method includes the steps of retrieving audio data from a storage medium in response to an input control signal, and performing control so that the retrieved audio data is decoded and output, and when the audio data is decoded and output, calculating a hit rate for at least one item represented by the audio data, and generating a playlist in accordance with the calculated hit rate.

Further, a computer readable medium configured for storing a set of instructions operative to manage a playlist is provided. The set of includes retrieving audio data from a storage medium in response to an input control signal, and performing control so that the retrieved audio data is decoded and output, and when the audio data is decoded and output, calculating a hit rate for at least one item represented by the audio data, and generating a playlist in accordance with the calculated hit rate. Also, the set of instructions includes retrieving a playlist stored in the storage medium, and performing control so that the audio data is decoded and output in accordance with the retrieved playlist.

According to a preferred embodiment of the present invention, the hit rates are calculated by calculating the length of frames of the pieces of audio data that have been decoded and output.

According to another preferred embodiment of the present invention, the playlist management unit names the generated playlist by using code values allowing it to be uniquely identified.

BRIEF DESCRIPTION OF THE DRAWINGS

The above and other objects and features of the present invention will become apparent from the following description of preferred embodiments given in conjunction with the accompanying drawings, in which:

FIGS. 8(a) to (c) are views showing examples of playlists that are named differently, according to an exemplary, non-limiting embodiment of the present invention.

DETAILED DESCRIPTION OF THE PREFERRED EMBODIMENTS

Hereinafter, preferred embodiments of the present invention will be described in detail with reference to the accompanying drawings.

Figure 2:
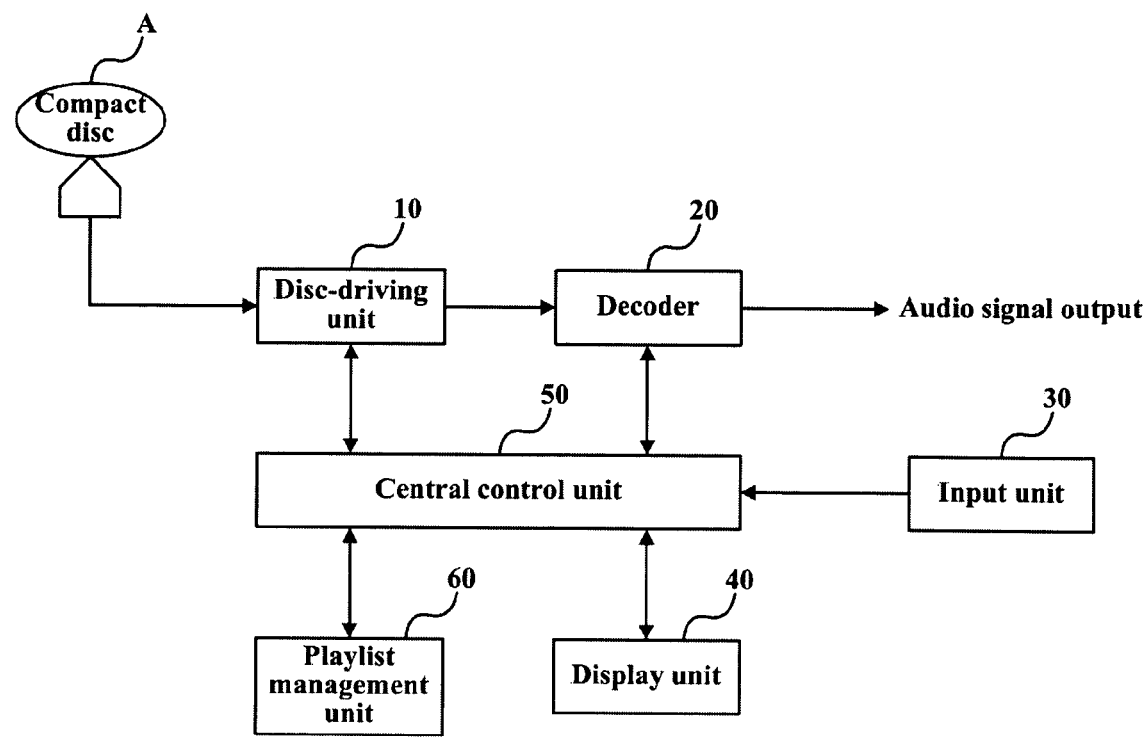
FIG. 2 is a schematic block diagram of a playlist managing apparatus according to an exemplary, non-limiting embodiment of the present invention.
Figure 3:
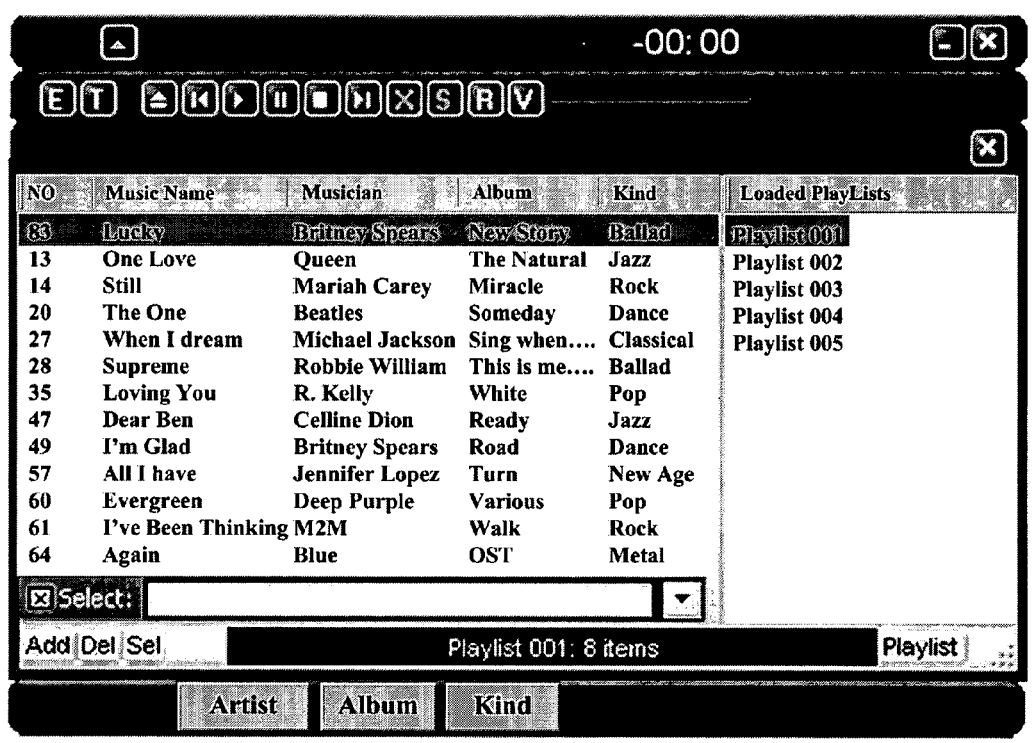
FIG. 3 is a view showing a screen configuration of an application program for implementing an exemplary, non-limiting embodiment of the present invention.

FIG. 2 is a schematic block diagram of a playlist managing apparatus according to the present invention, and FIG. 3 is a view showing a screen configuration of an application program for implementing the present invention.

The playlist managing apparatus comprises a disc-driving unit 10, a decoder 20, an input unit 30, a display unit 40, a central control unit 50, and a playlist management unit 60.

The disc-driving unit 10 picks up and outputs data recorded on a CD A through focusing and tracking. When the CD A is inserted into a player, a lead-in area of the inserted CD A is searched and a TOC in the lead-in area is transmitted to the central control unit 50. Audio data are picked up from the CD A and then output to the decoder 20 in accordance with control of the central control unit 50.

At this time, additional information such as [Music No.], [Music Name], [Musician], [Album Name] and [Time] for all pieces of audio data recorded on the CD A is included in the TOC. The central control unit 50 reads the TOC and converts the additional information into a proper format to be displayed on a screen, which is output to the display unit 40.

Since the constitution and operation of the disc-driving unit 10 are the same as a disc-driving unit generally used in the related art field of CD reproducing apparatuses, the detailed description thereof will be omitted.

When compressed audio data is input from the disc-driving unit 10 to the decoder 20, the decoder 20 decodes the audio data into audio signals, and outputs the audio signals. That is, the decoder 20 decodes the compressed audio data and performs dequantization of the decoded data to restore quantization performed during encoding of the data, so that the original audio signals can be output.

Since the constitution and operation of the decoder 20 are also the same as a decoder generally used in the field of CD reproducing apparatuses, the detailed description thereof will be omitted.

The input unit 30 receives input from a user through buttons and accordingly outputs predetermined control signals to the central control unit 50. As shown in FIG. 3, the input unit 30 includes a play button, a skip button, a pause button, a stop button, a play mode button, a volume button and the like, which are implemented as user interfaces in an application program.

When the user selects a specific button, the central control unit 50 recognizes the button selected by the user and controls the disc-driving unit 10, the decoder 20, the display unit 40 or the playlist management unit 60 in response to the input.

For example, but not by way of limitation, if the user selects the skip button, the central control unit 50 stops reproducing the piece of audio data that is currently reproduced, controls the disc-driving unit 10 to reproduce the next piece of audio data, and controls the display unit 40 to display information on the next piece of audio data to be reproduced.

Alternatively, if the user selects the stop button, the central control unit 50 stops reproducing the piece of audio data that is currently reproduced. If the user selects the pause button, the central control unit 50 temporarily stops reproducing the piece of audio data that is currently reproduced. If the user selects the play mode button, the central control unit 50 allows the user to select any one of the following three modes: a sequential mode capable of sequentially reproducing a plurality of pieces of audio data included in a playlist, a random play mode capable of randomly reproducing the plurality of pieces of audio data, and a shuffle play mode capable of shuffling the plurality of pieces of audio data so that pieces of audio data, which have been previously reproduced among the pieces of the audio data, are not repeatedly reproduced and randomly reading and reproducing pieces of audio data.

Although the input unit 30 has been implemented as the application program (set of instructions) executed in a computer (or computer readable medium) in the present embodiment as shown in FIG. 3, the play button, the skip button, the pause button, the stop button, the play mode button, the volume button and the like of the input unit 30 may also be implemented, for example, as hardware buttons.

The display unit 40 displays the playlist and the additional information on the audio data, which are picked up through the disc-driving unit 10, on a screen thereof. In response to control commands from the central control unit 50, the display unit 40 displays the playlist recorded in the TOC of the CD A on the screen. Alternatively, if the user selects any playlist, the display unit 40 sequentially displays pieces of audio data included in the selected playlist on the screen, and displays the additional information such as [Music No.], [Music Name], [Musician], [Album Name] and [Time] for the respective pieces of audio data on the screen upon reproduction of the pieces of audio data.

Further, the display unit 40 displays additional information on a piece of audio data, which is currently being reproduced, in an accent color (e.g., red), and additional information on pieces of audio data that have not yet been reproduced or have already been reproduced, in a relatively faint color (e.g., gray). Accordingly, the display unit 40 allows the user to more easily understand which piece of audio data is currently being reproduced and will be subsequently reproduced, and the like.

The central control unit 50 controls the disc-driving unit 10, the decoder 20, the display unit 40 and the playlist management unit 60 in response to input from the user through the buttons of the input unit 30 so as to control the general operation of the reproduction of audio data. Hereinafter, the operation of the central control unit 50 will be described in detail.

When the CD A is inserted into a player, the central control unit 50 retrieves the TOC of the CD A through the disc-driving unit 10, reads the retrieved TOC, transmits the playlist recorded in the TOC to the playlist management unit 60, and causes the playlist to be displayed on the screen of the display unit 40.

Moreover, when the user selects a specific playlist through the input unit 30, the central control unit 50 recognizes the selection of the specific playlist and causes the information such as [Music No.], [Music Name], [Musician], [Album Name] and [Time] for pieces of audio data included in the selected playlist to be displayed on the screen of the display unit 40, as shown in FIG. 3.

Furthermore, when the user selects the play button in the input unit 30, the central control unit 50 recognizes the selection of the play button and causes the pieces of audio data included in the playlist to be reproduced. The central control unit 50 retrieves the pieces of audio data to be reproduced from a program area of the CD A through the disc-driving unit 10. Then, the central control unit 50 causes the retrieved pieces of audio data to be decoded through the decoder 20 to output audio signals which the user can listen to. In addition, the central control unit 50 controls the general operation of the reproduction of the audio data.

The playlist management unit 60 calculates a hit rate for each piece of audio data during reproduction of the piece of audio data included in the playlist. After completing the reproduction of all pieces of audio data included in the playlist, a piece of audio data with a low hit rate is automatically deleted from the playlist, so that the piece of audio data that the user does not like is not reproduced. This feature is described in greater detail in connection with the description given in conjunction with FIG. 5.

Meanwhile, a playlist managing method according to the present invention comprises the steps of picking up pieces of audio data from a storage medium in response to an input control signal and performing control so that the picked-up pieces of audio data are decoded and output; and when the pieces of audio data are being decoded and output, calculating hit rates for the respective pieces of audio data and generating a playlist in accordance with the calculated hit rates.

Figure 4:
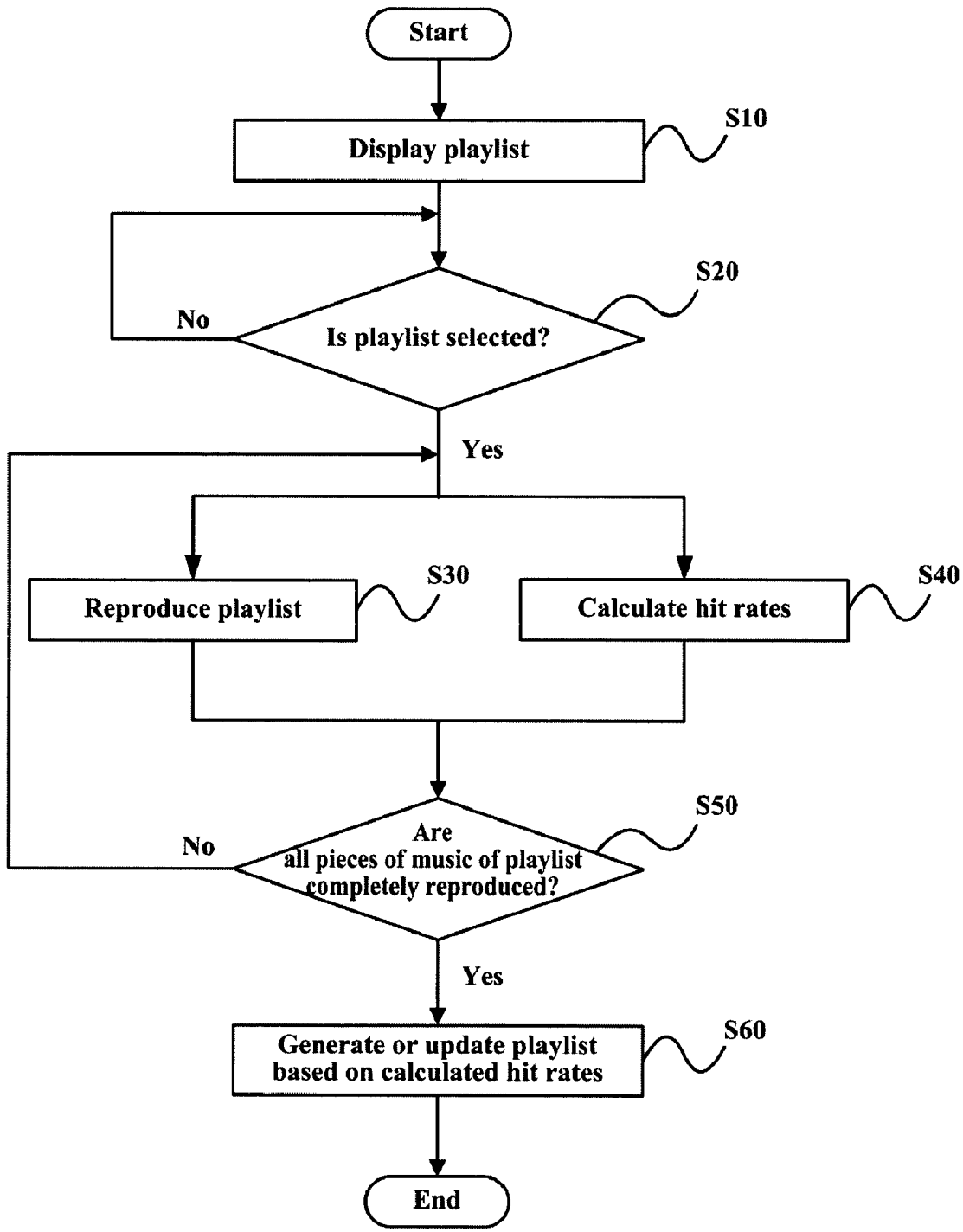
FIG. 4 is a flowchart generally illustrating a playlist managing method according to an exemplary, non-limiting embodiment of the present invention.

FIG. 4 is a flowchart generally illustrating the playlist managing method according to the present invention.

When the CD A is inserted into the player, the central control unit 50 reads the TOC of the inserted CD A, transmits the playlist recorded in the TOC to the playlist management unit 60, and causes the playlist recorded in the TOC to be displayed on the display unit 40 (S10).

At this time, if there is no playlist in the TOC, the central control unit 50 causes a default playlist, which includes names of all pieces of music recorded on CD A, to be displayed on the screen.

When the user selects any of the playlists (S20), pieces of audio data included in the selected playlist are displayed on the display unit 40 in the order to be reproduced. At this time, the additional information such as [Music No.], [Music Name], [Musician], [Album Name] and [Time] for the pieces of audio data is also displayed on the screen.

The user may select a specific playlist among playlists prepared by himself/herself, or among a plurality of playlists categorized according to kinds, artist or album. For example, but not by way of limitation, a playlist categorized according to kinds includes kind indexes such as [Ballads], [Jazz], [Rock], [Dance] and [Classical]. A playlist categorized by album includes album indexes such as [New Story], [The Natural], [Miracle] and [Someday]. A playlist categorized by artist includes artist indexes such as [Queen], [Mariah Carey], [Beatles], and [Michael Jackson]. However, the present invention is not limited thereto.

Meanwhile, when the pieces of audio data included in the playlist are displayed on the screen in the order to be reproduced, the user may edit the playlist or generate a new playlist through various operations such as the drag and drop operation of a mouse.

Then, when the user selects the play button, the central control unit 50 sequentially reproduces the pieces of audio data through the disc-driving unit 10 and the decoder 20 in accordance with the selected playlist (S30). This will be described in greater detail below. When the central control unit 50 controls the disc-driving unit 10 so that jumps can be made to track positions where the pieces of audio data are recorded, the disc-driving unit 10 accordingly picks up the pieces of audio data from the CD A and outputs them to the decoder 20. The decoder 20 decodes the input pieces of audio data to generate audio signals that the user can listen to, and outputs the audio signals.

Figure 1:
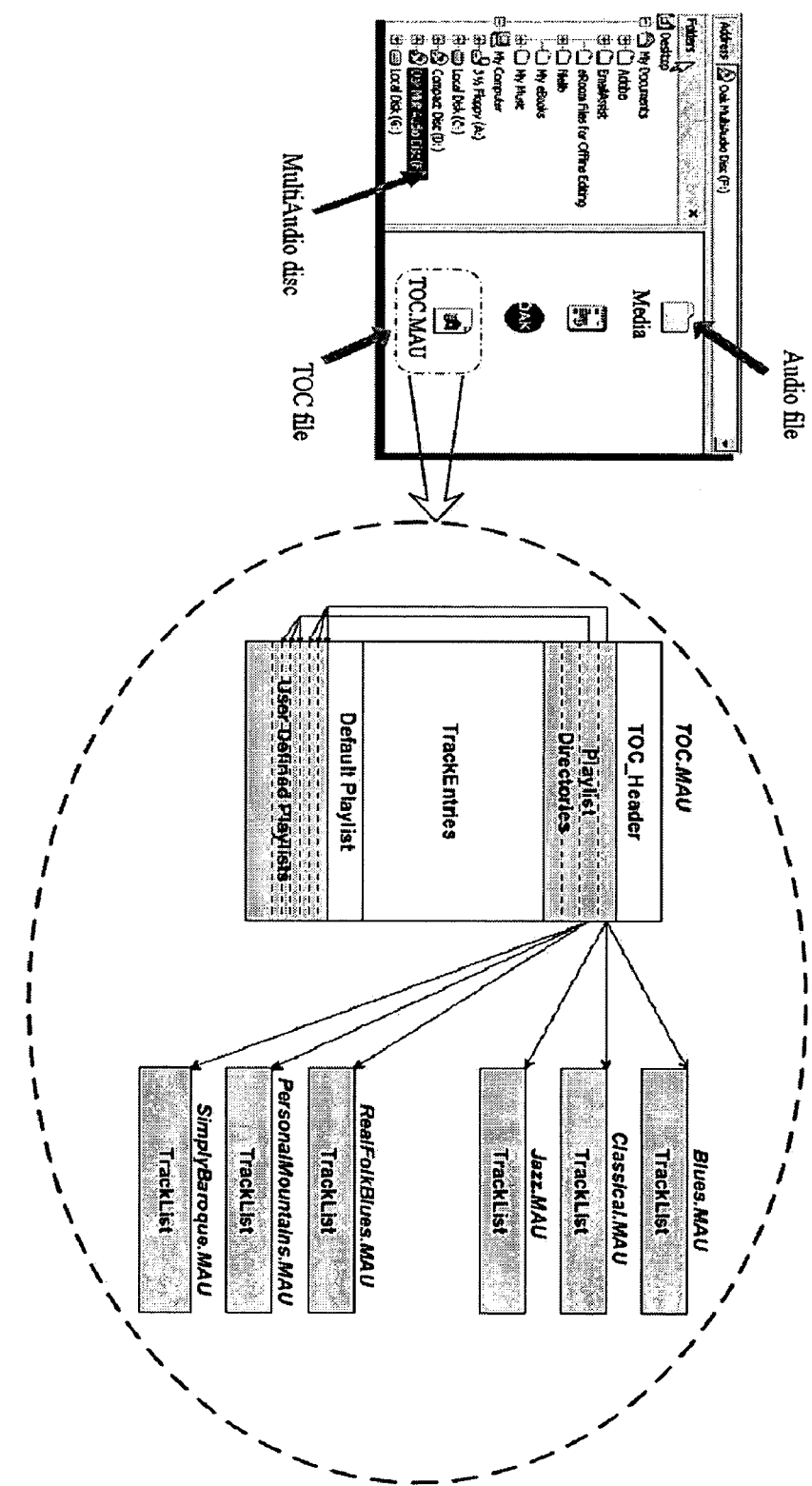
FIG. 1 is a view showing a layout of related art MA data.

As described in connection with FIG. 1, if an undesired piece of audio data is reproduced during the pieces of audio data included in the playlist, the user presses the skip button, or performs an operation of deleting the piece of audio data from the relevant playlist. This is troublesome in the related art, as the process must be repeated each time that undesired piece of audio data is encountered.

To this end, the an exemplary, non-limiting embodiment of present invention causes pieces of audio data that the user does not like not to be reproduced by calculating the hit rates for the respective pieces of audio data while the pieces of audio data included in the playlist are reproduced (S40), and by updating the playlist in accordance with the calculated hit rates. The step of calculating the hit rates S40 will be explained more specifically with reference to FIGS. 5 and 6.

Figure 5:
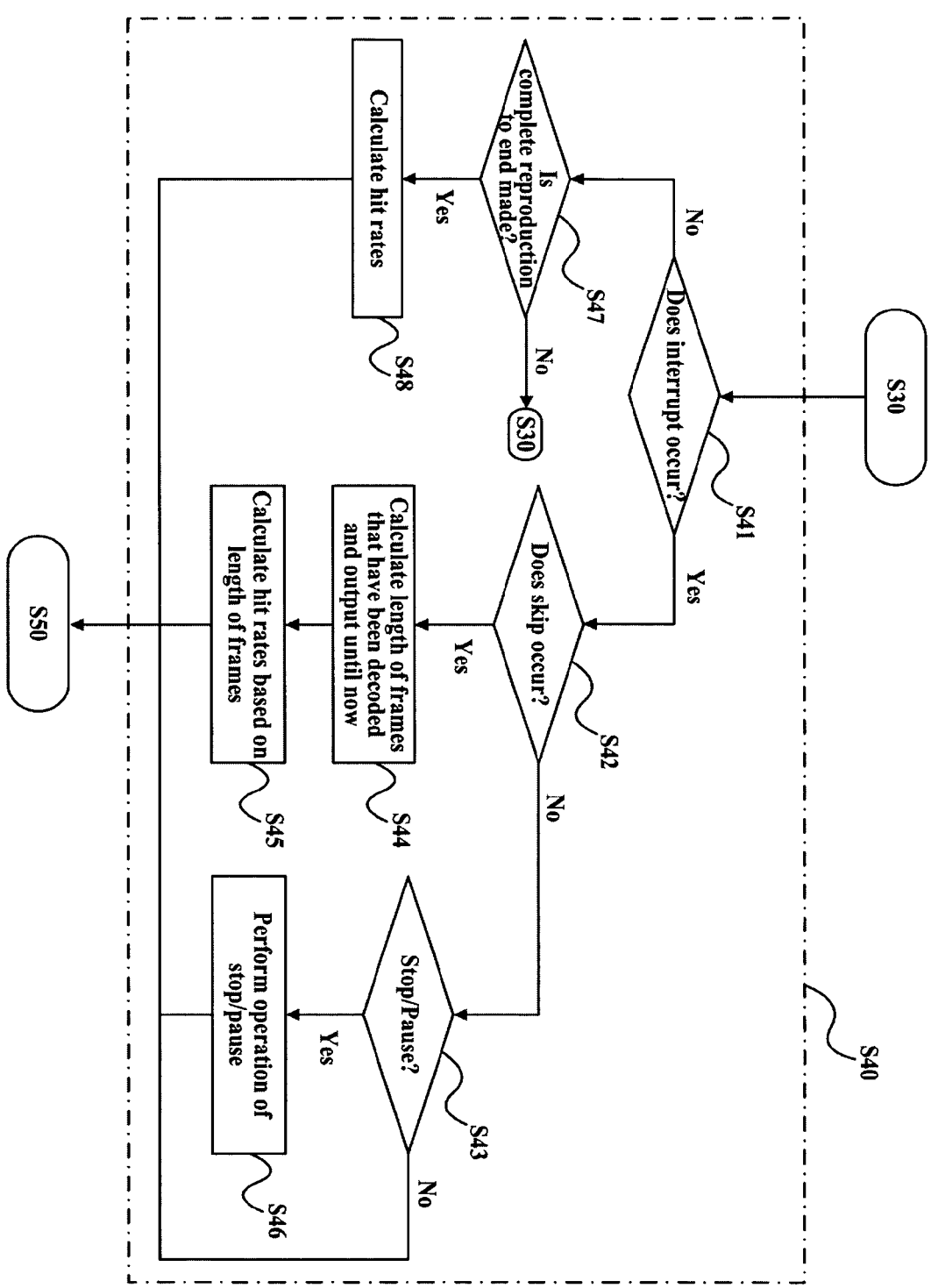
FIG. 5 is a detailed flowchart of the hit rate calculation step in FIG. 4, according to an exemplary, non-limiting embodiment of the present invention.

FIG. 5 is a detailed flowchart of the hit rate calculation step S40 in FIG. 4. The playlist management unit 60 first determines whether an interrupt occurs during the reproduction of a piece of audio data (S41). If the interrupt has occurred due to user's button operation, it is determined whether the interrupt has resulted from selection of the skip button (S42) or the stop/pause button (S43).

If the interrupt has resulted from the selection of the skip button, the central control unit 50 controls the disc-driving unit 10 so that a jump is made to a track position where the next piece of audio data is recorded, and calculates the length of frames that have been decoded and output through the playlist 60 until now (S44). The length of the frames that have been decoded and output until now can be simply calculated based on a difference in time between a moment when a relevant piece of audio data started to be decoded and a moment when the skip button was selected.

Once the length of the frames that have been decoded and output until now is calculated in such a manner, the playlist management unit 60 calculates a hit rate for the relevant piece of audio data based on the calculated length of the frames (S45). Hereinafter, a hit rate calculation method for the piece of audio data will be explained in detail with reference to FIG. 6.

Figure 6:
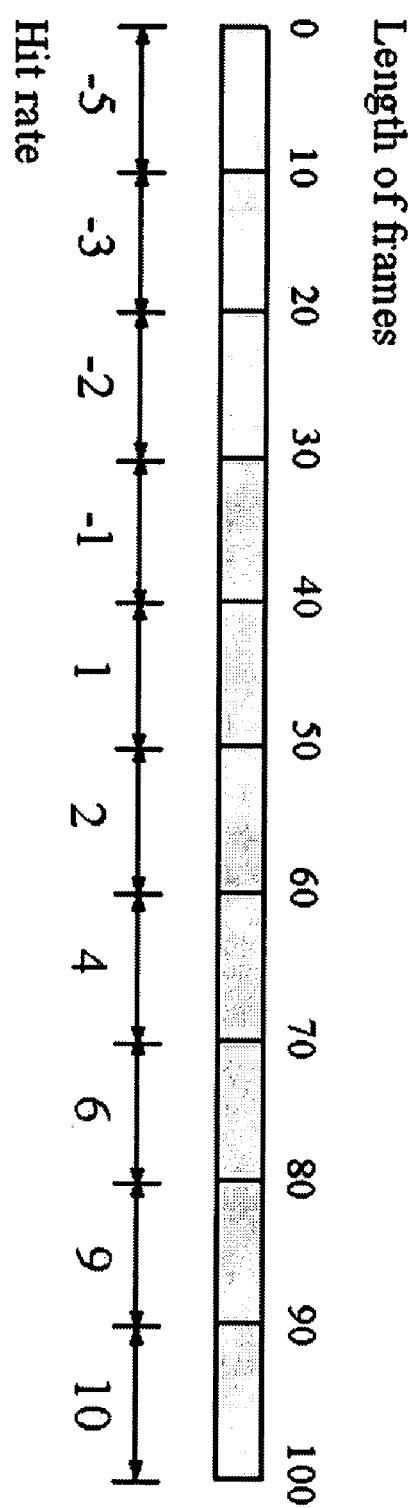
FIG. 6 is a view illustrating a hit rate calculation method according to an exemplary, non-limiting embodiment of the present invention.

FIG. 6 is a view illustrating the hit rate calculation method for a piece of audio data. Assuming that an entire length of a piece of audio data is 100, the hit rate is expressed as a value weighted based on the length of the decoded output frames (i.e. weight value). For example, but not by way of limitation, a hit rate for a piece of audio data decoded and output until 40 frames is calculated as −1, and a hit rate for a piece of audio data decoded and output until 80 frames is calculated as 6.

Weight based on the length of the decoded output frames may be changed. The hit rate may be calculated based on a reproduction ratio of a piece of audio data (i.e. a ratio of a play time of the piece of audio data until the selection of the skip button to a total play time of the piece of audio data), in addition to the length of the decoded output frames.

That is, the hit rate in the present invention can be understood as having the same meaning as the user's preference for a piece of audio data. Therefore, a piece of audio data with a low hit rate can be determined as a piece of music that the user does not like, whereas a piece of audio data with a high hit rate can be determined as a piece of music that the user likes.

Returning to FIG. 5, when the interrupt has resulted from the selection of the stop button, the central control unit 50 stops reproducing a piece of audio data, which is currently reproduced, by controlling the disc-driving unit 10 and the decoder 20. If the interrupt has resulted from the selection of the pause button, the central control unit 50 temporarily stops reproducing the piece of audio data that is currently reproduced (S46).

Meanwhile, if no interrupt occurs during reproduction of a piece of audio data, the playlist management unit 60 confirms whether the relevant piece of audio data has been completely reproduced up to its end (S47). If so, a hit rate according to the reproduction completion of the piece of audio data is calculated (S48). Since the hit rate calculation method has been explained specifically with reference to FIG. 6, the detailed description thereof will be omitted.

Referring again to FIG. 4, the playlist management unit 60 calculates the hit rates for the respective pieces of audio data through such a process, and then confirms whether all the pieces of audio data included in the playlist have been completely reproduced (S50). If so, the playlist management unit 60 generates a new playlist, or updates the relevant playlist based on the calculated hit rates (S60). Hereinafter, a playlist update step S60 will be explained in detail with reference to FIG. 7.

Figure 7:
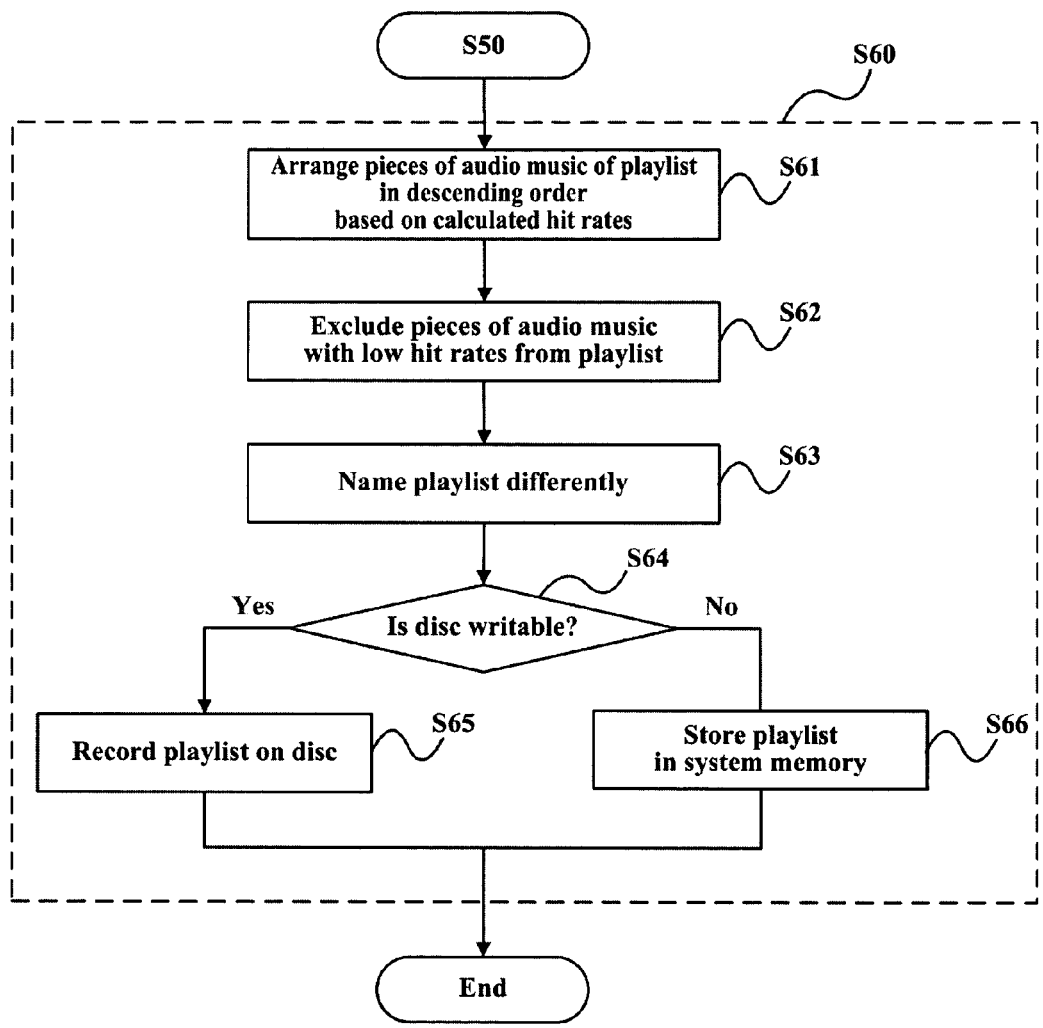
FIG. 7 is a detailed flowchart of the playlist update step in FIG. 4 according to an exemplary, non-limiting embodiment of the present invention.

FIG. 7 is a detailed flowchart of the playlist update step S60 in FIG. 4. The playlist management unit 60 first arranges all the pieces of audio data included in the playlist in descending order based on the calculated hit rates (S61). Pieces of audio data with low hit rates are determined as pieces of music that the user does not like and then excluded from the playlist (S62).

Referring to FIG. 3, for example, but not by way of limitation, while pieces of audio data included in a playlist 001 are sequentially reproduced, the playlist management unit 60 calculates hit rates for the respective pieces of audio data. Hit rates for "Lucky," "One love," "The one," "When I dream," "Supreme," "Dear Ben," "I'm glad," "All I have," and "I've Been Thinking," which have been completely reproduced, are calculated as 10, respectively. Hit rates for "Still," "Loving You," "Evergreen," and "Again," which have been skipped at earlier portions during reproduction thereof, are calculated as 5, respectively.

The calculated hit rates are temporarily stored in an audio management information area. When reproduction of the playlist is completed, the playlist management unit 60 then arranges the pieces of audio data in descending order based on the hit rates recorded in the audio management information area. "Still," "Loving You," "Evergreen," and "Again" with the low hit rates are determined as pieces of music that the user does not like, and are then excluded from the playlist.

That is, the playlist management unit 60 determines whether the user likes each of the pieces of audio data based on its calculated hit rate, and excludes pieces of audio data which the user does not like among the pieces of audio data included in the playlist from the relevant playlist so as not to reproduce pieces of audio data that the user does not like.

Meanwhile, the playlist management unit 60 differently names the playlist generated in such a process by using the ISO (International Organization for Standardization) 9660 file system and predetermined code values as follows, so that the generated playlist can be distinguished from those of other playlists recorded on the same CD or other CDs (S63). Hereinafter, a playlist naming method will be explained in detail with reference to FIG. 8.

The ISO 9660 file system is a standard file system for a CD that allows the CD to be read independent of platform used (e.g., Windows and Macintosh). Files prepared based on the ISO 9660 file system can be read by almost any computer. To meet the ISO 9660 file system, a file name should follow 8.3 format (i.e. a maximum of 8 letters and/or numbers followed by a period and a three-letter extension).

The playlist management unit 60 names playlists based on code values allowing the playlists to be uniquely identified while meeting the ISO 9660 file system. At this time, the code values allowing the playlists to be uniquely identified include, for example, those generated based on identifiers (e.g., volume labels) allowing CDs to be identified, hit rates, kinds, or play times of all or a portion of each of the playlists.

FIGS. 8(*a*) to (*c*) are views showing examples of playlists that are named differently according to such a naming method. As shown in FIG. 8(*a*), the playlist management unit 60 can name playlists X_T__10.MAU, X_T__50.MAU, X_T__100.MAU and the like, so that generated playlists can be recognized as playlists generated based on top ranks of hit rates in a CD with a volume label of X.

Alternatively, as shown in FIG. 8(*b*), the playlist management unit 60 can name playlists Y_K_BLUE.MAU, Y_K_ROCK.MAU, Y_K_POP.MAU and the like, so that generated playlists can be recognized as playlists generated based on kinds in a CD with a volume label of Y.

Otherwise, as shown in FIG. 8(*c*), the playlist management unit 60 can name playlists Z_P_TOT.MAU, Z_P_10.MAU, Z_P_20.MAU and the like, so that generated playlists can be recognized as playlists generated based on play times in a CD with a volume label of Z.

Although the code values for the naming of playlists have been expressed alphabetically in the present embodiment for the purpose of easy understanding of the present invention, the code values may be arbitrarily changed to hexadecimal numbers or special characters.

The present invention can also be implemented as a computer-readable medium having a set of instructions corresponding to the foregoing steps.

The present invention has various advantages. For example, but not by way of limitation, owing to such a playlist naming process, even though a CD was removed from and has been inserted again into a player, a playlist including only pieces of music that the user likes among a plurality of playlists can be automatically recognized. Thus, it is not necessary to again perform an operation for excluding pieces of music that the user does not like from a playlist.

Then, the playlist management unit 60 confirms as to whether the currently inserted CD A is a writable medium (S64). If it is confirmed that the CD is a writable medium, an updated playlist is recorded in the User Defined Playlist field of the TOC in the CD A through the disc-driving unit 10 (S65). If not, the updated playlist is recorded in a system memory (e.g., RAM or ROM) implemented with a flash memory (S66).

On the other hand, if such a playlist is not recorded in the TOC of the CD A (i.e. only a default playlist exists), pieces of audio data included in the default playlist may be arranged in descending order based on calculated hit rates so as to generate a new playlist.

As described above, according to the present invention, there is an advantage in that a user can listen to only pieces of audio data desired by himself or herself without additionally performing a skip operation or a playlist editing operation, by automatically generating or updating a playlist in response to a change in taste of the user.

Although the preferred embodiments of the present invention have been described by way of example with reference to the accompanying drawings, they are only illustrative. It can be understood by those skilled in the art that various modifications and other equivalent embodiments can be made thereto.

According to the present embodiments, for example, but not by way of limitation, if a playlist is changed in a state where the entire playlist of the CD A has not yet been reproduced, the user may repeatedly listen to a piece of music which he/she has already listened to, and it may take a lot of time for the user to listen to pieces of music which he/she has not yet listened to. Therefore, the case where the playlist is reproduced at least once from the beginning to the end and then updated has been described by way of example. However, the moment when the playlist is updated may be arbitrarily changed, for example, in such a manner that the playlist is updated when a calculated hit rate reaches a threshold.

Further, although the case of reproducing audio data has been described in the embodiments, the present invention is not limited thereto. For example, but not by way of limitation, the present invention may be widely applied to a case of reproducing video contents.

Moreover, although the case where the playlist of music names recorded in the TOC of the CD is used as the playlist in the present embodiments has been described, the present invention is not limited thereto. For example, but not by way of limitation, the present invention may be widely applied to a case where a variety of management tables recorded in a memory of a personal computer are used as the playlist.

What is claimed is:

1. A playlist managing apparatus, comprising:
 a disc-driving unit that receives audio data from a storage medium;
 a decoder that receives the audio data from the disc-driving unit, and decodes and outputs the received audio data;
 a central control unit that controls operations of the disc-driving unit and the decoder in response to at least one input control signal; and
 a playlist management unit that calculates a hit rate for the audio data based on an output state of the audio data, and that generates a playlist based on the calculated hit rates;
 wherein the hit rate is calculated by calculating a length of frames of the audio data that has been decoded and output.

2. The apparatus as claimed in claim 1, wherein the hit rate is weighted based on the length of frames of the audio data that has been decoded and output.

3. The apparatus as claimed in claim 1, wherein the output state of the audio data used for the calculation of the hit rate is one of skip and reproduction completion.

4. A playlist managing apparatus, comprising:
 a disc-driving unit that receives audio data from a storage medium:
 a decoder that receives the audio data from the disc-driving unit, and decodes and outputs the received audio data;
 a central control unit that controls operations of the disc-driving unit and the decoder in response to at least one input control signal; and
 a playlist management unit that calculates a hit rate for the audio data based on an output state of the audio data, and that generates a playlist based on the calculated hit rates;
 wherein the hit rate is weighted based on the length of frames of the audio data that has been decoded and output.

5. The apparatus as claimed in claim 4, wherein the output state of the audio data used for the calculation of the hit rate is one of skip and reproduction completion.

6. A playlist managing apparatus, comprising:
 a disc-driving unit that receives audio data from a storage medium;
 a decoder that receives the audio data from the disc-driving unit, and decodes and outputs the received audio data;
 a central control unit that controls operations of the disc-driving unit and the decoder in response to at least one input control signal; and
 a playlist management unit that calculates a hit rate for the audio data based on an output state of the audio data, and that generates a playlist based on the calculated hit rates;
 wherein the playlist management unit names the generated playlist using code values allowing the generated playlist to be uniquely identified; and wherein the code values are generated with the calculated hit rates.

7. The apparatus as claimed in claim 6, wherein the code values are generated with identifiers allowing the storage medium to be identified.

8. A playlist managing apparatus, comprising:
a disc-driving unit that receives audio data from a storage medium;
a decoder that receives the audio data from the disc-driving unit, and decodes and outputs the received audio data;
a central control unit that controls operations of the disc-driving unit and the decoder in response to at least one input control signal; and
a playlist management unit that calculates a hit rate for the audio data based on an output state of the audio data, and that generates a playlist based on the calculated hit rates;
wherein the playlist management unit names the generated playlist using code values allowing the generated playlist to be uniquely identified; and
wherein the code values include those generated with a total or partial play time of the generated playlist.

9. A playlist managing method, comprising the steps of:
retrieving audio data from a storage medium in response to an input control signal, and performing control so that the retrieved audio data is decoded and output; and
when the audio data is decoded and output, calculating a hit rate for at least one item represented by the audio data, and generating a playlist in accordance with the calculated hit rate;
wherein output state of the audio data used for the calculation of the hit rate is one of skip and reproduction completion.

10. The method as claimed in claim 9, wherein the hit rate is calculated by calculating a length of frames of the audio data that has been decoded and output.

11. The method as claimed in claim 9 or 10, wherein the hit rates is weighted based on a length of frames of the audio data that has been decoded and output.

12. The method as claimed in claim 9 or 10, further comprising the step of naming the generated playlist using code values allowing the generated playlist to be uniquely identified.

13. The method as claimed in claim 12, wherein the code values are generated based on identifiers allowing the storage medium to be identified.

14. The method as claimed in claim 12, wherein the code values are generated based on the calculated hit rate.

15. The method as claimed in claim 12, wherein the code values are generated based on a total play time or a partial play time of the generated playlist.

16. A computer readable medium configured for storing a set of instructions operative to manage a playlist, said set of instructions comprising:
retrieving audio data from a storage medium in response to an input control signal, and performing control so that the retrieved audio data is decoded and output;
when the audio data is decoded and output, calculating a hit rate for at least one item represented by the audio data, and generating a playlist in accordance with the calculated hit rate;
retrieving a playlist stored in the storage medium; and
performing control so that the audio data is decoded and output in accordance with the retrieved playlist;
wherein an output state of the audio data used for the calculation of the hit rate is one of skip and reproduction completion, and the hit rate is calculated by calculating a length of frames of the audio data that has been decoded and output.

17. The computer readable medium of claim 16, wherein the hit rates is weighted based on a length of frames of the audio data that has been decoded and output.

* * * * *